H. W. LANG.
NUT LOCK.
APPLICATION FILED JULY 15, 1912.
1,042,569.
Patented Oct. 29, 1912.
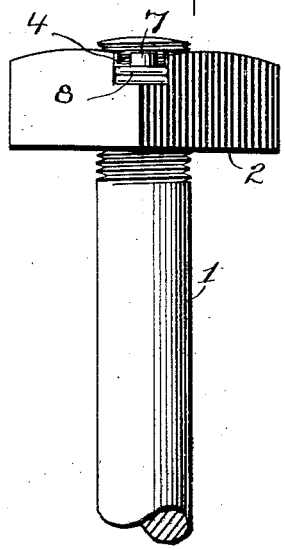
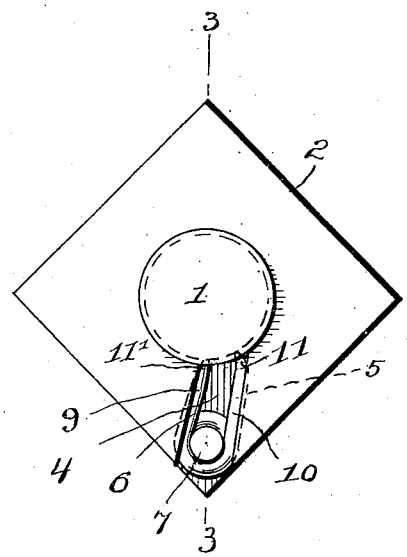
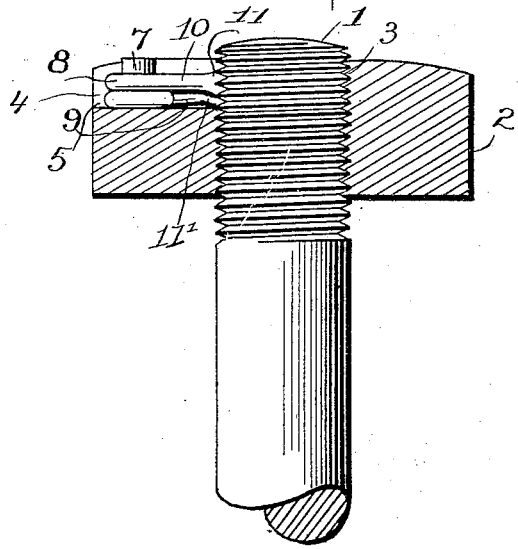
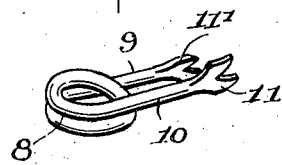
Witnesses
R. N. Jones.
Inventor
H. W. Lang.
By
Attorneys

UNITED STATES PATENT OFFICE.

HOWARD W. LANG, OF LITCHFIELD, NEBRASKA.

NUT-LOCK.

1,042,569.      Specification of Letters Patent.      Patented Oct. 29, 1912.

Application filed July 15, 1912. Serial No. 709,545.

*To all whom it may concern:*

Be it known that I, HOWARD W. LANG, a citizen of the United States, residing at Litchfield, in the county of Sherman, State of Nebraska, have invented certain new and useful Improvements in Nut-Locks; and I do hereby declare the following to be a full, clear, and exact description of the invention, such as will enable others skilled in the art to which it appertains to make and use the same.

The present invention is directed to improvements in nut locks and has for its object to so construct a device of this character that the nuts will be positively held against accidental rotation.

A further object of the invention is to construct a device of this character which is simple in construction, durable, and one which may be manufactured at a minimum cost.

With these and other objects in view, this invention resides in the novel features of construction, formations, combinations and arrangements of parts to be hereinafter more fully described, claimed and illustrated in the accompanying drawing, in which:—

Figure 1 is a side elevation of the device. Fig. 2 is a top plan view. Fig. 3 is a sectional view on line 3—3 of Fig. 2. Fig. 4 is a detail perspective view of the locking pawl.

Referring to the drawing, the numeral 1 designates the bolt which is of conventional form, and 2 the nut which is adapted for application thereto.

Extending from one corner of the nut and opening into the bolt opening 3 thereof is a recess 4, the side walls of which are formed with under-cut shoulders 5, which are arranged in opposing relation, and serve to hold the spring metal pawl 6 from moving upwardly from out of the recess 4.

Rising from the recess 4 is a post 7, the upper end of which is on a plane with the upper surface of the nut 2 and is surrounded by the coil 8 of the pawl 6. The natural tendency of the coil 8 is to force the arms 9 and 10 of the pawl 6 away from each other so that the same will bear firmly against the under-cut shoulders 5. The post 7 serves to prevent longitudinal movement of the pawl 6, and in conjunction with the shoulders 5, said pawl is held firmly within the recess 4.

The arm 10 of the pawl terminates in a vertically disposed blade 11, the edge of which is serrated so that the same will readily engage the threads of the bolt 1, said blade being angularly disposed in relation to the arm 10 so that the same will readily permit the rotation of the nut for placing the same upon the bolt, but will prevent the reverse rotation of said nut.

It will be noted that the under-cut shoulders or side walls of the recess 4 are arranged in converging relation, so that the coils 8 may readily pass therebetween and the arms 9 and 10 when sprung toward each other will pass downwardly in the recess and when released will engage against the shoulders, thus firmly holding the pawl in place. The arm 10 being provided with the blade 11 is consequently of slightly greater length than the arm 9 thereby projecting the edge of the blade 11 in the bolt opening 3 for ready engagement with the threads of the bolt 1. The arm 9 is formed with a similar blade 11', said arm being slightly less in length than the arm 10, and as the arms are arranged in oblique relation to the axis of the bolt 1 the blades 11 and 11' will firmly grip the bolt.

What is claimed is:—

A nut lock, in combination with a bolt, of a nut having a recess formed in its upper surface, said recess opening into the bolt opening of the nut, the side walls of said recess being formed with under-cut shoulders, a post rising from the recess and having its upper end on a plane with the upper surface of the nut, a pawl formed from a single length of resilient metal and consisting of coils adapted to encircle the post, the side arms of said pawl being adapted to bear against the under-cut shoulders, said arms being provided with blades adapted to engage threads of the bolt, as and for the purpose set forth.

In testimony whereof, I affix my signature, in presence of two witnesses.

HOWARD W. LANG.

Witnesses:
D. W. PETERS,
H. S. LANG.

---

Copies of this patent may be obtained for five cents each, by addressing the "Commissioner of Patents, Washington, D. C."